(12) United States Patent
Li (10) Patent No.: US 9,170,473 B1
(45) Date of Patent: Oct. 27, 2015

(54) INTEGRATED SELF-PHOTOGRAPHING APPARATUS

(71) Applicant: GoTech LLC, Freeport, NY (US)

(72) Inventor: Zhengliang Li, Shenzhen (CN)

(73) Assignee: GoTech LLC, Freeport, NY (US)

( * ) Notice: Subject to any disclaimer, the term of this patent is extended or adjusted under 35 U.S.C. 154(b) by 0 days.

(21) Appl. No.: 14/729,620

(22) Filed: Jun. 3, 2015

(30) Foreign Application Priority Data

Sep. 11, 2014 (CN) ...................... 2014 2 0522729 U (51) Int. Cl.
    *G03B 17/56* (2006.01)
(52) U.S. Cl.
    CPC ............ *G03B 17/561* (2013.01); *G03B 17/563* (2013.01); *G03B 17/565* (2013.01)
(58) Field of Classification Search
    CPC ... G03B 17/561; G03B 17/563; G03B 17/565
    See application file for complete search history.

(56) References Cited

U.S. PATENT DOCUMENTS

| 4,530,580 A | 7/1985 | Ueda et al. | |
| 7,706,673 B1 * | 4/2010 | Staudinger et al. | 396/58 |
| 2013/0176412 A1 * | 7/2013 | Chen | 348/77 |

* cited by examiner

*Primary Examiner* — WB Perkey
(74) *Attorney, Agent, or Firm* — Timothy Wang; Ni, Wang & Marsand (57) ABSTRACT

An integrated self-photographing ("selfie") apparatus includes an extendable pole and gripping apparatus for photography equipment; the gripping apparatus includes a support platform and a retractable clamping structure. The described gripping apparatus is connected with the upper end of a stretchable and retractable pole. The support platform has an open slot, the described gripping apparatus is equipped with a curved segment corresponding to the open slot, and the described stretchable and retractable pole can recede into the open slot with the curved segment after being folded. The clamping structure contains snapping sockets which correspond to the snapping posts on a mirror that can be attached. The present design eliminates the need for assembly when used. The extendable pole can be conveniently retracted and stored in the open slot on the support platform and the curved segment of the clamping structure, which allows easy transport.

14 Claims, 7 Drawing Sheets

INTEGRATED SELF-PHOTOGRAPHING APPARATUS

TECHNICAL FIELD

The inventions disclosed herein generally relate to the field of photographic support equipment (paraphernalia), specifically an integrated self-photographing ("selfie") apparatus.

BACKGROUND OF THE INVENTION

When people travel, they frequently take along photography equipment like a digital camera or smart phone to record the scenery and their traveling companions by means of photography. In order for all the travelers in a group to be photographed together, the traditional method used is for one of the individuals in the group to take the photographic apparatus and face it towards themselves while taking a photo in reverse, which is called self-photographing or taking a "selfie." However, because of the relatively large size of the photographic apparatus, self-photographing is very inconvenient, and it is further necessary to press the button to photograph, which can cause the image to shake, and the camera's focus and radius not to match property, thus causing the resulting photograph to be very poor; moreover, when the number of people is relatively large, it may be impossible for everyone to be photographed together.

In order to overcome the above-described flaws with self-photographing ("selfie" taking), various types of self-photography apparatuses have been introduced in the market, some of which makes use of hand-carried self-photographing apparatuses to hold the photographic apparatus at a certain distance from the photographer, and others make use of remote controls in order to take photographs, in order to achieve better photographing angles and self-photographing results. Currently-existing self-photographing apparatuses must be disassembled into several parts when transported, and require assembly at the time of usage, then again require disassembly after usage, which creates a great deal of inconvenience for the user. During the process of assembly, disassembly, and transport it is easy for the photographic apparatus to become inoperative due the breaking or loss of parts, which is another inconvenience.

SUMMARY OF THE INVENTION

The inventions disclosed herein target the above-described flaws of currently-existing techniques, and provide an integrated self-photographing apparatus, thus overcoming the flaw of needing to assemble the self-photographing apparatus before usage, and to disassemble it after usage. It offers other useful features such as a shutter button and an optional mirror etc.

The object of the present inventions is to provide an integrated self-photographing apparatus, including an extendable pole and a gripping apparatus used to grip a photographic equipment; the gripping apparatus includes a support platform and a stretchable or compressible/tightening clamping structure above the support platform, the gripping apparatus as a whole is rotatably connected to the end of the extendable pole.

Further improvements of the present inventions are: an open slot on the support platform, a curved segment on the described gripping apparatus which corresponds to the described open slot, and that the extendable pole can be folded into the space formed by the open slot and curved segment.

A further improvement of the present inventions includes: the extendable pole includes several stretchable and retractable joint segments.

A further improvement of the present inventions includes: an upper connect that is integrated with the top joint segment of the extendable pole.

A further improvement of the present inventions includes: the upper connector and the gripping apparatus is rotatably connected to the upper connector. The connector further includes a fastener for tightening the connection between said gripping apparatus and said upper connector.

A further improvement of the present inventions includes: the extendable pole is equipped with a handle on its bottom end, and the handle is equipped with a shutter button for photographing control.

A further improvement of the present inventions includes: the extendable handle includes a slip-resistant area, which is equipped with slip-resistant grooves.

A further improvement of the present inventions includes: the bottom of the extendable handle is equipped with a power switch.

A further improvement of the present inventions includes: the bottom of the extendable handle is equipped with a "USB" slot.

A further improvement of the present inventions includes: the design of the support platform is tilted downward.

A further improvement of the present inventions includes: the support platform includes a front section and a back section with the back section lower than the front section.

A further improvement of the present inventions includes: the clamping structure is located at the back section of the support platform; and the curved segment of said clamping structure protrude towards the front end direction of the support platform. The curved segment of the clamping structure further comprises a handle and a soft pad underneath the handle.

A further improvement of the present inventions includes: the extendable handle is equipped with anti-slip grooves.

The benefits of the presently disclosed selfie sticks are: the gripping apparatus is rotatably connected to the end of the extendable pole. There is no need for assembly when used, thus providing great convenience: after use, it is possible to immediately retract and fold the extendable pole into the space created by the curved segment of the clamping structure and the open slot on support the platform. Also, there is no need to occupy any additional space and the device is easy to transport.

DETAILED DESCRIPTION

Figure 1:
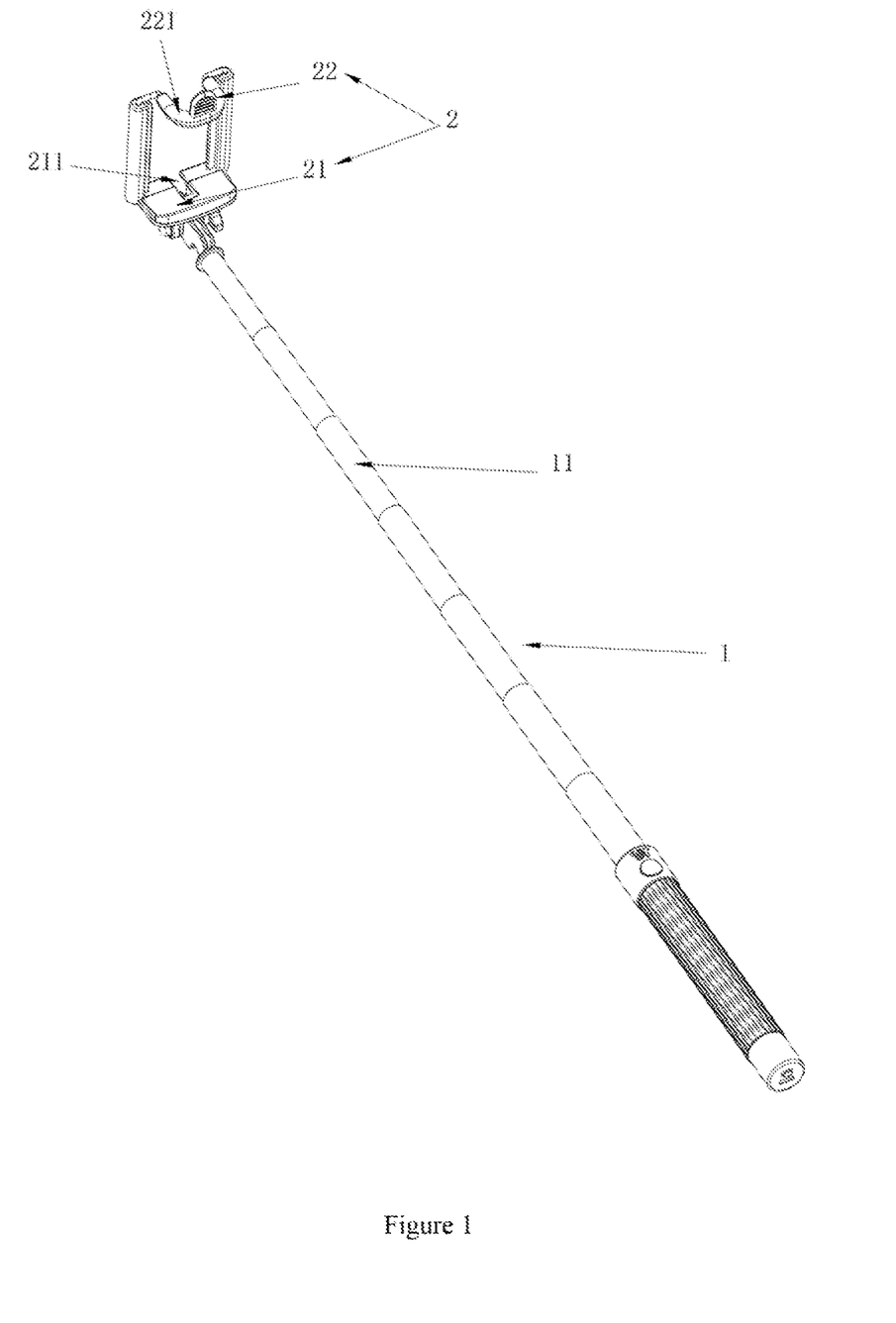
FIG. 1 depicts a three-dimensional structural illustration of one preferred embodiment of the integrated self-photographing apparatuses in operation.

As shown in FIG. 1, one preferred embodiment of the integrated self-photographing apparatuses includes an extendable pole 1, a gripping apparatus 2 for holding a photographic equipment, which includes a support platform 21 and above it a compressible/tightening clamping structure 22, and the gripping apparatus 2 as a whole is rotatably connected with the upper end of the extendable pole 1. The support platform 21 has an open slot 211, the clamping structure 22 has in its middle portion a curved segment 221 that corresponds to the open slot 211, and the extendable pole 1 can be folded into the open space created by the open slot 211 and curved segment 221. When using the apparatus one can pull the extendable pole 1 out of the open slot 211 and the curved segment 221. The gripping apparatus 2 is rotatably connected with the top end of the extendable pole 1 at the time of usage, thus there is no need for assembly, which provides great convenience. After usage one immediately retract and fold the extendable pole 1 into the open slot 211 of the support platform 21 and the curved segment 221 of the clamping structure 22, without the need to occupy additional space, facilitating transport of the apparatus. Depending on the specific embodiment, one can fold either forwardly or backwardly into the open slot 211 and the curved segment 221.

Further, the extendable pole 1 includes several stretchable and retractable joints 11. During usage of this self-photographing apparatus, by means of extending the stretchable and retractable joints 11 one can extend the extendable pole 1 to the appropriate length, and place the self-photographing equipment held by the gripping apparatus 2 at a certain appropriate distance from the user. Further, this preferred embodiment includes a remote control set-up, by means of which one can self-photography via wireless connection and control of the self-photographing apparatus, by means of which one can enjoy larger and better angles for photography, and improve the user's self-photographing experience. The described wireless connection can be via Wi-Fi or Bluetooth or any other mode of wireless connection.

Figure 2:
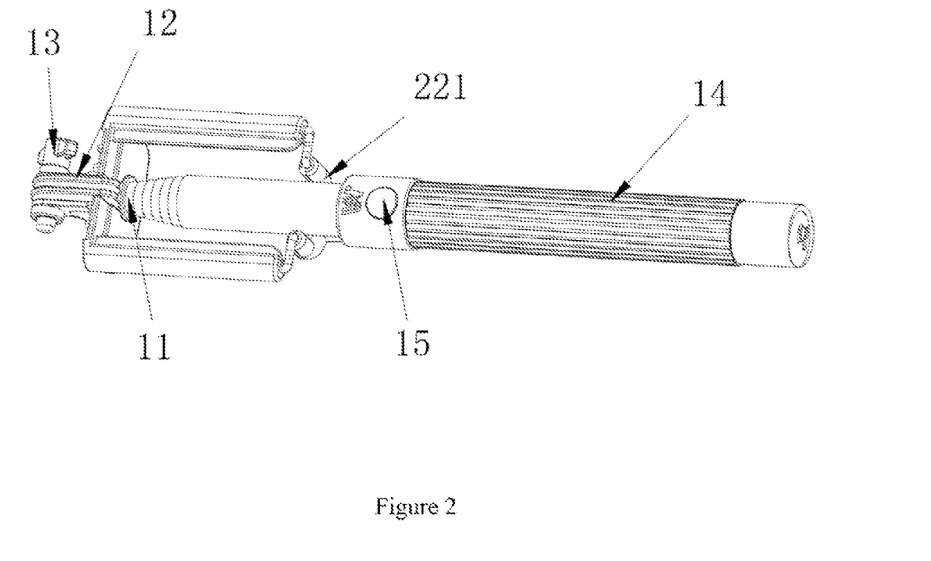
FIG. 2 depicts a three-dimensional structural illustration of one preferred embodiment of the integrated self-photographing apparatuses when folded up.
Figure 3:
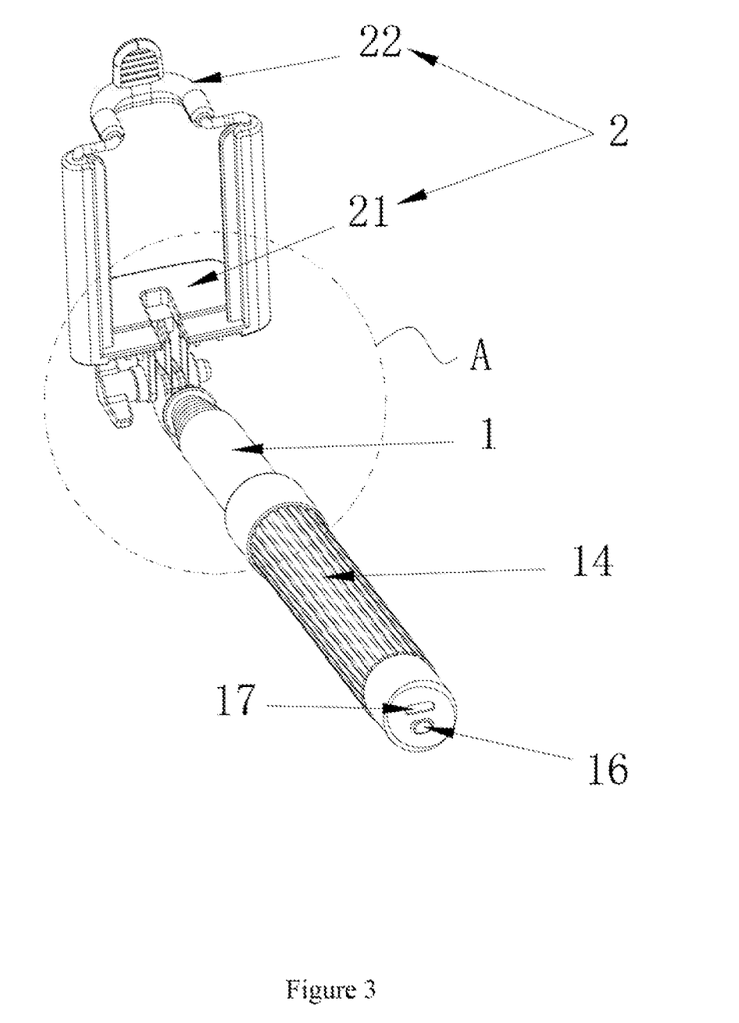
FIG. 3 depicts a three-dimensional structural illustration of one preferred embodiment of the integrated self-photographing apparatuses in anther operating state.
Figure 4:
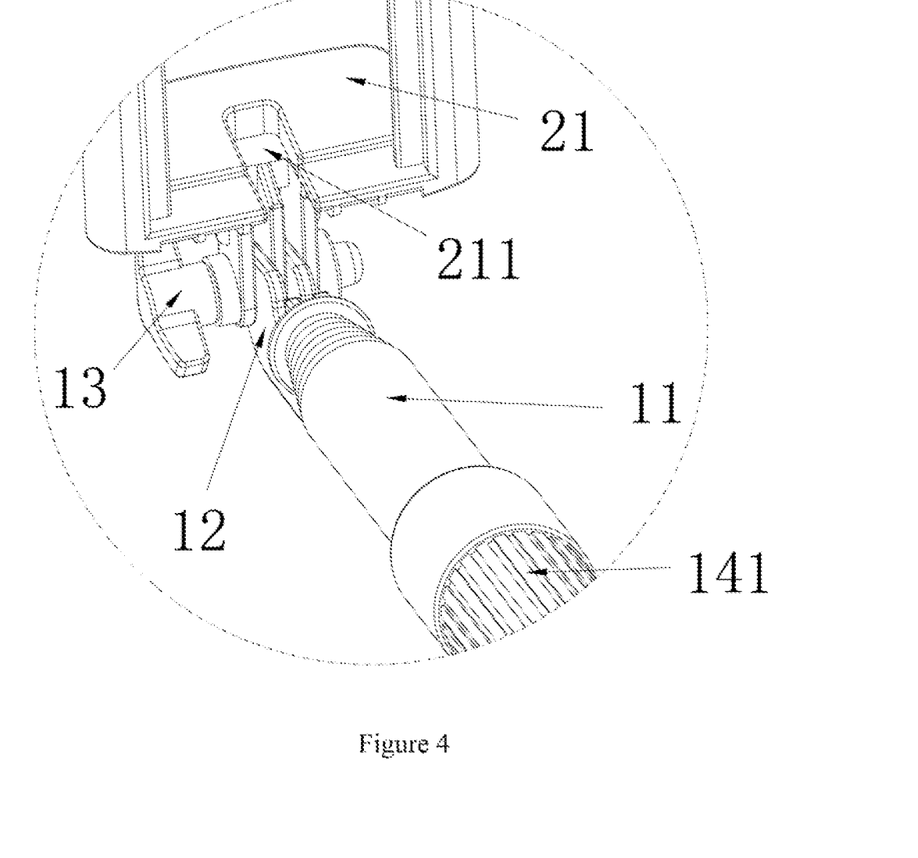
FIG. 4 depicts an enlarged illustration of Part A in FIG. 3.

As shown in FIGS. 2-4, another preferred embodiment further a connector 12 at the top end of the extendable pole 1, which is installed in an integrated manner onto the upper end of the top connector 11 of the extendable pole 1. The connector 12 is rotatably connected with the gripping apparatus 2, and there is a fastener 13 that is used to tighten the connection between the gripping apparatus 2 and the connector 12.

When transporting this integrated self-photographing apparatus, one can retract and fold the connector 12 into the position of the open slot 211 of support platform 21. At this time the protruding position of the curved segment 221 can also be correspondingly retracted into the extendable pole 1. Such a design creates a fully integrated selfie stick and also avoids taking up additional space, which provides great convenience for transportation. The described fastening apparatus 13 is not only used to fasten the connector 12 and gripping apparatus 2, but at the same time also serves as the turning axle between the connector 12 and gripping apparatus 2. By means of the hinged connection between the connecter 12 and griping apparatus 2, the adjustment of the self-photographing equipment's angle can be accomplished at the time of self- or other forms of photography, thus producing better photography results.

Further, the extendable pole 1 has at its bottom end a handle segment 14, which includes a shutter button 15 for photographing control. The handle segment 14 includes a slip-resistant area 141, which has anti-slip grooves. In this particular example, the shutter button 15 is placed on the anterior portion of the slip-resistant area 141. When using this integrated self-photographing apparatus, a user grasps the slip-resistant area 141 in his/her hand, while the thumb can lightly rest upon the shutter button 15. Further, the handle area 14 has inside it a remote control set-up, and the shutter button 15 is one part of the remote-control set-up. The handle area 14 has at its bottom end a power switch 16, which is used to turn on or off the power for the remote control set-up. The power switch 16 placed on the bottom end of the handle area 14 can prevent accidental misuse while operating the self-photography apparatus.

Further, the handle area 14 has a USB slot 17 on its bottom end. The USB slot 17 is electrically connected with the remote control set-up circuit board, in order to achieve the exchange of data between the remote control set-up and the computer, or to allow the remote control set-up software to be updated, and the remote control set-up's batteries can also be charged by means of the USB slot 17.

Figure 5:
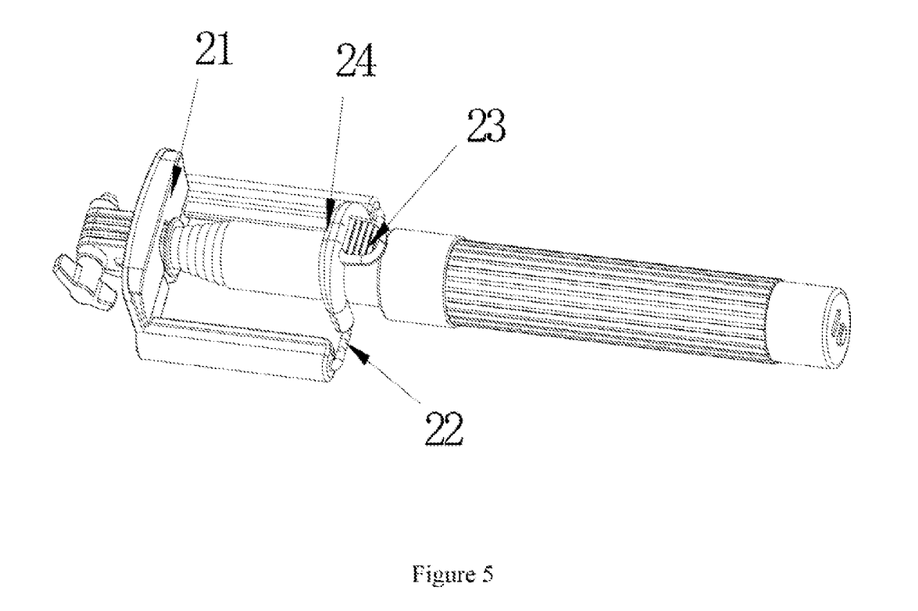
FIG. 5 depicts a three-dimensional structural illustration of one preferred embodiment of the integrated self-photographing apparatuses in another folding state.
Figure 6:
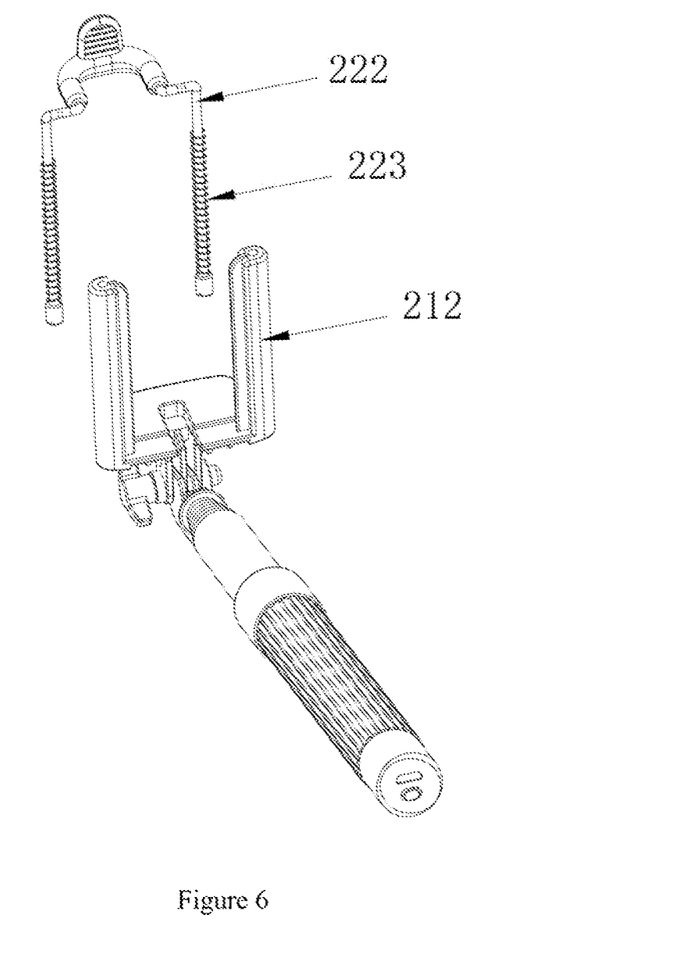
FIG. 6 depicts a three-dimensional structural illustration of one preferred embodiment of the integrated self-photographing apparatuses highlighting more details of the clamping structure of the gripping apparatus.

As shown in FIG. 5-6, another preferred embodiment includes a support platform 21 comprises a front section and a back section with the back section lower than the front section. The clamping structure 22 is located the support platform 21's back section, and the curved segment 221 protrudes towards the front end direction of the support platform 21. The curved segment 221 of the clamping structure 22 further comprises a handle and a soft pad underneath the handle. The pull-handle has on it slip-resistant grooves. Specifically, the support platform 21 has on the back portion of its upper surface two supporting arms 212. The clamping structure 22 includes a moveable stick 222 and springing apparatus 223. The moveable stick 222 has two ends which can each respectively stretch to extend, placed in the two supporting arms 212, and the curved segment 221 is located at the center portion of the moveable stick 222. The curved segment 221 is also located above the front portion of the upper surface of the support platform 21. The soft pad 24 is contained in the curved segment 221. The springing apparatus 223 is placed between the moveable stick 222 and the support arms 212. Furthermore, the springing apparatus 223 and the two ends of the moveable stick 222 are all placed in the inner cavity of the two supporting arms 212. The springing apparatus 223 has two ends that lean against the moveable stick 222 and the inner cavity of the two supporting arms 212. The springing apparatus 223 improves over existing selfie sticks with its spring mechanism.

At the time of usage, a user can move the handle 23 to put the moveable sticks 222 into upwards motion, the motion of the moveable stick 222 causes the distance between the support platform 21 and soft pad 24 to increase. When this increase in distance is greater than the height of the photographing device like a digital camera or smart phone, one can place the camera on the support platform 21. After releasing the moveable stick 222, the spring apparatus 2223 placed between the moveable stick 222 and two supporting arms 212 can carry the movable stick 222 into downward motion, thus gripping the camera or smart phone.

Figure 7:
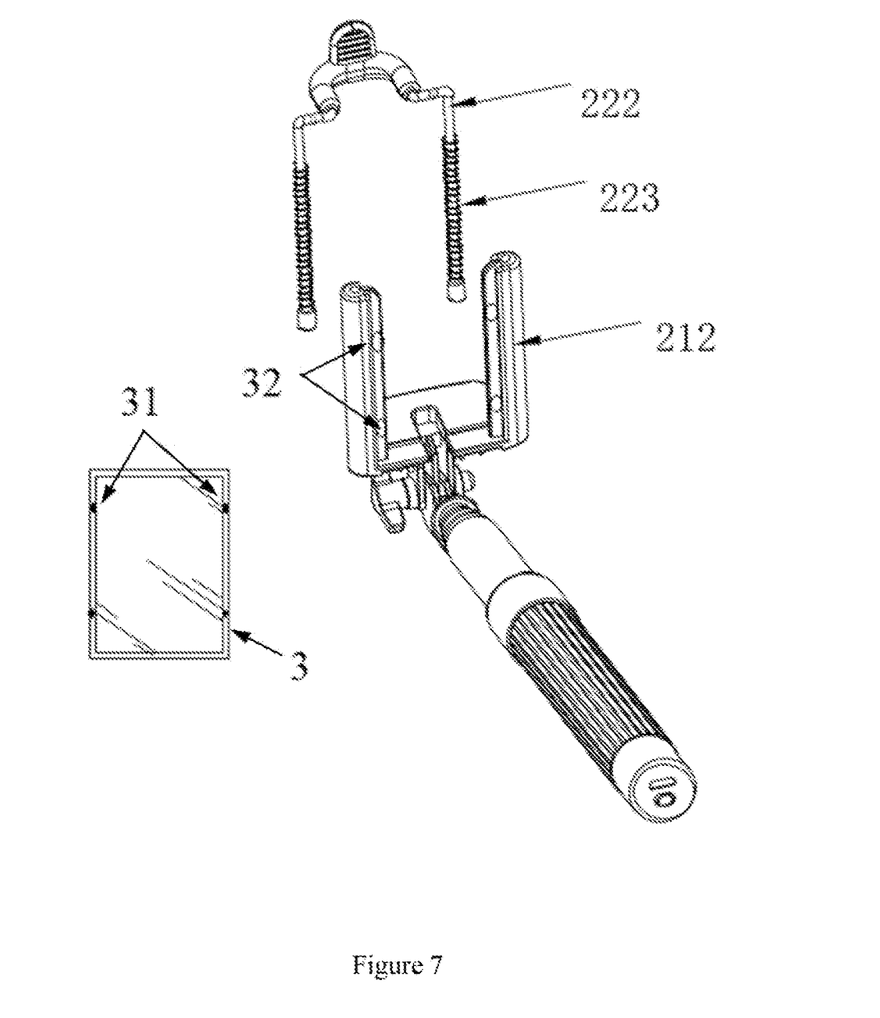
FIG. 7 depicts a three-dimensional structural illustration of one preferred embodiment of the integrated self-photographing apparatuses highlighting an optional mirror containing one ore more snap posts that can be snapped into or unsnapped from the clamping structure.

As shown in FIG. 7, the clamping structure 22 in this embodiment has one or more snap sockets 32 that correspond to the one or more snapping posts 31 on a mirror 3. The snapping posts 31 on the Mirror 3 may be inserted into the snapping sockets 32 on the clamping structure 22. This allows the holder of the selfie apparatus to be able to see what image will be taken.

Although several exemplary embodiments of the present inventions have been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims

The invention claimed is:

1. An integrated self-photographing ("selfie") apparatus comprising:
    an extendable pole;
    a gripping apparatus used to grip a photographing equipment;
    wherein said gripping apparatus includes a support platform for support the photographing equipment: a retractable clamping structure sitting atop of said support platform;
    wherein said gripping apparatus as a whole is rotatably connected to the upper end of said extendable pole; and
    wherein said support platform includes an open slot; and said clamping structure includes a curved segment corresponding to the open slot so that said extendable pole can be retracted and folded into said open slot and curved segment.

2. An integrated self-photographing ("selfie") apparatus according to claim 1 wherein said extendable pole includes one or more retractable joint segments.

3. An integrated self-photographing ("selfie") apparatus according to claim 2 wherein said extendable pole has an upper connector, which is integrated with the top joint segment of the extendable pole.

4. An integrated self-photographing ("selfie") apparatus according to claim 3 wherein said gripping apparatus is rotatably connected to said upper connector; and further comprises a fastener for tightening the connection between said gripping apparatus and said upper connector.

5. An integrated self-photographing ("selfie") apparatus according to claim 2 wherein said extendable pole further comprises a handle segment at its lower end with a shutter button for photographing control.

6. An integrated self-photographing ("selfie") apparatus according to claim 5 wherein said handle segment further comprises a slip-resistant section with anti-slip grooves.

7. An integrated self-photographing ("selfie") apparatus according to claim 5 wherein said handle segment further comprises a power switch.

8. An integrated self-photographing ("selfie") apparatus according to claim 6 wherein the bottom end of the said handle segment further comprises a USB port.

9. An integrated self-photographing ("selfie") apparatus according to claim 1 wherein the top surface of said support platform further comprises a front section and a back section with the back section lower than the front section.

10. An integrated self-photographing ("selfie") apparatus according to claim 9 wherein said clamping structure is located at the back section of the support platform; and the curved segment of said clamping structure protrude towards the front end direction of the support platform.

11. An integrated self-photographing ("selfie") apparatus according to claim 10 wherein said curved segment of the clamping structure further comprises a handle and a soft pad underneath the handle.

12. An integrated self-photographing ("selfie") apparatus according to claim 11 wherein said handle further comprises anti-slip grooves.

13. An integrated self-photographing ("selfie") apparatus according to claim 1 further comprises a mirror that can be attached to the clamping structure wherein the mirror faces the holder of the selfie apparatus.

14. An integrated self-photographing ("selfie") apparatus according to claim 13 wherein said mirror further comprises one or more snap posts that can be inserted into one or more corresponding snap sockets on the clamping structure.

\* \* \* \* \*